March 24, 1964 S. KURTIN 3,126,495

CATHODE RAY TUBE WITH A CONCAVE VIEWING SCREEN

Filed Sept. 11, 1959

INVENTOR.
STEPHEN KURTIN

BY Kleinberg & Lilling

ATTORNEYS

United States Patent Office 3,126,495

Patented Mar. 24, 1964

3,126,495

CATHODE RAY TUBE WITH A CONCAVE VIEWING SCREEN

Stephen Kurtin, 594 Cumberland Ave., Teaneck, N.J.

Filed Sept. 11, 1959, Ser. No. 839,505
3 Claims. (Cl. 313—89)

The invention here presented is broadly in the field of the signal reproducing art; more specifically it presents an improved cathode-ray tube; and in detail it is concerned with a cathode ray tube for viewing televised images with a three-dimensional effect.

While cathode-ray tubes for viewing televised images are well known, their use has heretofore generally been limited to images with only two dimensions. Although several methods for viewing three-dimensioned television images have been proposed, they have all been complicated, and expensive to produce, since they incorporate relatively complex electronic components.

It is a cardinal object of this invention, therefore, to provide a cathode-ray tube for viewing three-dimensional television images.

It is another primary object to provide a television display tube with an improved image.

It is another object of this invention to set forth a device, as described above which is economical to produce and which has relatively few additional working parts.

Still another object is to provide a television tube with an improved double acting face plate.

Briefly described, the above and other objects and advantages are obtained by providing an improved face-plate screen on a television tube body of almost identical construction with the conventional tubes. The improved screen is arched inward or concave when viewed from the exterior of the tube. The curvature of the screen, being more sharply defined at its outer edges, creates the impression of having certain parts of an image impressed thereon appear to move toward the observer when these same parts of the image move towards any of the outer edges of the improved screen. This three-dimensional effect vastly improves the realism of the reproduced image.

With the above mentioned objects in view, the invention consists of the novel features of construction and arrangement of parts which will appear in the following specification and recited in the appended claims, reference being had to the accompanying drawings in which the same reference numerals indicate the same parts throughout both figures, and in which:

Figures 1, 2:
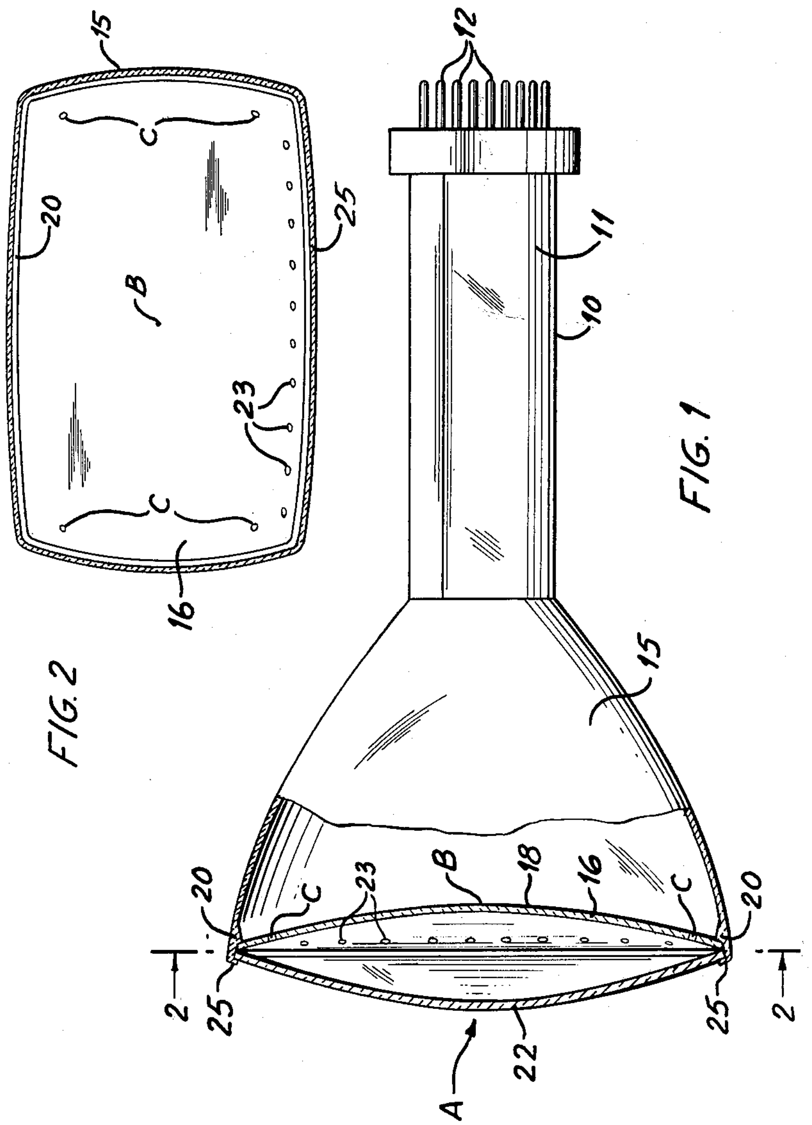
FIG. 1 is an elevational view of a television viewing tube constructed according to the invention, partly in section, with one portion of the enclosing glass cut away to illustrate the front screen construction.
FIG. 2 is an elevational sectional view taken substantially along line 2—2 of FIG. 1.

Referring now more particularly to FIG. 1, which illustrates what may be for some purposes a preferred embodiment of the invention, I have shown a cathode ray tube 10 having a conventional neck 11 and electric contact prongs 12. Contained within the neck 11, and electrically connected to the prongs 12 is the normal electric beam structure with horizontal and vertical deflecting circuits. It will be noted that the details of these components are not shown, since they are standard and form no part of the present invention.

At the end of hollow tube 11 and integrally connected thereto in a pressure-tight manner is a flared out portion 15, terminating at the viewing end A of the tube. The flared out portion 15 may be so shaped as to conclude in a substantially rectangular form as illustrated in FIG. 2, or any other well-known television screen shape.

Situated at the viewing end A of tube 10 is the viewing screen 16 comprised of a transparent material such as glass or the like. The viewing screen 16 is coated with a layer of fluorescent material 18 on its inward surface. As in the conventional cathode ray tube, the electronic beam, acted on by the deflecting circuit yoke, is directed against the layer of fluorescent material causing spots of light. As the spots of light move horizontally and vertically across the face of the screen 16 an image appears thereon.

In the conventional tube the viewing screen is convex or arched outward. It is important to note, however, that the instant invention requires that the viewing screen 16 be concave or arched inward. The screen 16 may be formed in any of several well-known geometric shapes but is preferably a section of a spheroid, either prolate or oblate.

The principle of operation of this device, briefly stated, is as follows: An image is produced on the fluorescent screen 16 in a standard manner. As any portion of the image moves toward the exterior margins of the screen, for example, from point B to any of the points C, it will actually move closer to the viewer and thus yield a three-dimensioned effect. To a person viewing at A the image will appear to "come out" towards him. The effect, of course, will be exactly reversed as an image moves closer to the center of the screen 16 as from any of points C towards point B. This three-dimensioned effect may be magnified by increasing the radius of curvature of the spheroid.

The screen 16 is integrally connected around its entire edge to the flared portion 15 of the tube. Optionally a shelf 20 may be provided in the flared portion 15 to help support the screen 16.

Since there is of necessity a much larger pressure of air on the exterior of the tube than on the evacuated interior, the entire tube 10 must possess sufficient strength to withstand the pressure differential, or collapse. The shape of screen 16 is not conducive to great strength, so it has been found desirable to provide a protective transparent outer shield 22. The bowed-outward arch shape of shield 22 will support many times the outward pressure capable of being supported by an inward arched shape such as 16. In addition, the outward shield 22 may be fabricated of the normal television glass which is substantially three-tenths of an inch thick. It has been found desirable to fabricate the viewing screen 16 of glass many times thinner. To prevent any stress at all on viewing screen 16, tiny perforations 23 may be provided there through to equalize any pressure differential. The perforations 23 shown in FIGS. 1 and 2 have been greatly magnified for illustrative purposes.

The parts should be welded together at their junction 25 to form a unitary construction.

The foregoing will suffice to impart a clear understanding of the invention without further explanation. Other advantages, not mentioned, will be readily apparent to the user. For example, the shape of screen 16, will act to substantially minimize objectional reflections from bright lights in juxtaposition the front of the television apparatus.

While there are above disclosed but a limited number of embodiments of the structure and product of the invention herein presented, it is possible to produce still other embodiments without departing from the inventive concept herein disclosed, and it is desired therefore that only such limitations be imposed on the appended claims as are stated therein, or required by the prior act.

Having thus described my invention, and illustrated its use, what I claim as new, and desire to secure by Letters Patent is:

1. A cathode ray tube envelope having a neck portion with electron gun means therewithin, a flaring portion integrally connected at one end to said neck, a screen of transparent material covering the other end of said flaring portion, said screen being arched inward towards said neck and being coated with a fluorescent material whereby an image moving across said screen will move towards or away from an observer, said screen material having perforations completely therethrough whereby there can be no differential pressure, and a shield attached in a leakproof manner to said flaring portion completely enclosing said screen, said shield being arched outward.

2. A cathode ray tube for producing a three dimensional effect having an envelope with two successive integral walls at its viewing end, the inner wall having a coating of fluorescent material for image reproduction and being convex towards the interior of said envelope whereby as an image moves from the central portion of said inner wall to any of its outer portions, said image will move longitudinally of said envelope thereby effecting three dimensional viewing, said other wall being convex to the outside of said envelope and constructed of a transparent and relatively smooth and non-distorting material whereby said outer wall will not substantially alter the viewing of said inner wall, and relatively minute openings in said inner wall whereby there will be no differential pressure across said inner wall.

3. In combination with a cathode ray tube envelope having a neck, and a flaring portion integrally connected at one end to said neck; a screen of transparent material covering the other end of said flaring portion, said screen being arched inward towards said neck and being coated with a fluorescent material and a transparent shield attached to said flaring portion covering said screen, and further including relatively small perforations through said screen.

References Cited in the file of this patent

UNITED STATES PATENTS

| | | |
|---|---|---|
| 2,160,081 | Niclassen | May 30, 1939 |
| 2,172,775 | Schmidt-Ott et al. | Sept. 12, 1939 |
| 2,866,126 | Skellett | Dec. 23, 1958 |
| 2,884,833 | Pohl | May 5, 1959 |

FOREIGN PATENTS

| | | |
|---|---|---|
| 443,788 | Great Britain | Mar. 5, 1931 |
| 569,582 | Great Britain | May 30, 1945 |
| 575,962 | Great Britain | Mar. 13, 1945 |
| 957,649 | France | Dec. 20, 1947 |